US006532082B1

(12) United States Patent
Dewitte

(10) Patent No.: US 6,532,082 B1
(45) Date of Patent: Mar. 11, 2003

(54) HALFTONE PRINTING PLATES CONTAINING MICROSCOPIC PERFORATIONS AND METHODS FOR PRODUCING SAME

(75) Inventor: Hans Dewitte, Brugge (BE)

(73) Assignee: Esko-Graphics, N.V., Ghent (BE)

( * ) Notice: Subject to any disclaimer, the term of this patent is extended or adjusted under 35 U.S.C. 154(b) by 0 days.

(21) Appl. No.: 09/350,250

(22) Filed: Jul. 8, 1999

Related U.S. Application Data

(60) Provisional application No. 60/093,074, filed on Jul. 16, 1998.

(51) Int. Cl.$^7$ .......................... H04N 1/405; H04N 1/52; B41C 1/00
(52) U.S. Cl. ...................... 358/3.3; 358/3.06; 358/3.13; 358/3.19; 358/3.2; 358/536
(58) Field of Search ................................. 358/3.3, 3.29, 358/3.06, 3.09, 3.02, 3.13, 3.19, 3.2, 534, 536

(56) References Cited

U.S. PATENT DOCUMENTS 5,155,599 A   10/1992  Delabastita ................ 358/3.07
5,235,435 A   8/1993   Schiller ..................... 358/3.07

FOREIGN PATENT DOCUMENTS

FR     2 660 245        10/1991   ............ B41N/1/00
WO    WO 96 02868 A1    2/1996    ............ G03F/7/24

*Primary Examiner*—Scott Rogers
(74) *Attorney, Agent, or Firm*—Dov Rosenfeld; Inventek

(57) ABSTRACT

A computer implemented method to include microscopic perforations (perforations) in an printing plate is revealed. The particles improve the properties of the plate towards printability of an image on different kinds of offset presses. The perforations are formed by perforations which are added in a fully digital way. Aspects of the invention include of three alternative embodiments for include the repelling particles, and these alternative embodiments may be uses alone or in combination depending on the user's preferred workflow. The third alternative embodiment adds the perforations through an additional layer in the page description, this layer comprising a pattern which erases small particles in the original design elements. The first alternative embodiment adds the perforations through a modified screening method. The second alternative embodiment includes perforations into existing bitmaps.

19 Claims, 7 Drawing Sheets

HALFTONE PRINTING PLATES CONTAINING MICROSCOPIC PERFORATIONS AND METHODS FOR PRODUCING SAME

CROSS-REFERENCE TO RELATED APPLICATION

This application claims the benefit of U.S. Provisional Patent Application Serial No. 60/093,074 for HALFTONE PRINTING PLATES CONTAINING MICROSCOPIC PERFORATIONS AND METHODS FOR PRODUCING SAME to inventor Dewitte, Assignee Barco Graphics, N.V., filed Jul. 16, 1998.

BACKGROUND OF THE INVENTION

1. Field of the Invention

This invention relates to digital halftoning for printing. In particular this invention relates to a method for producing halftone printing plates containing microscopic ink repelling areas.

2. Description of the Prior Art

Printing can be done using different printing processes. The most important processes currently used are offset, gravure and flexography. Each of these processes has its advantages and disadvantages, and these processes compete with each other in price, quality and flexibility. Currently, offset is the most important process, certainly when the printing substrate is paper.

The offset process produces a printed result on a substrate by bringing over ink selectively from an ink source to an offset plate, then to an offset blanket and finally onto the substrate. Whether the final substrate will be inked (printed) or not in a particular location is determined by whether or not a corresponding zone on the printing plate will be inked.

Offset plates are flat plates which, when ready for printing, contain both ink repelling and ink receptive zones. The ink receptive zones receive ink and transfer the ink to an offset blanket, which in turn transfers the ink onto a substrate which may be paper, carton board, or other media. In traditional offset printing, the ink repelling zones accept water, and once humid, do not accept ink, so that the corresponding areas on the substrate are left blank. Waterless offset printing methods also are known in the prior art.

Whether traditional or waterless offset is used, the location of the ink receptive zones typically is determined by digital artwork, which may include linework (also called line art), continuous-tone, "contone," ("CT") images, or a combination, and the way the artwork is screened. Screening is the process of creating the illusion of a continuous-tone image on a device which can only reproduce two output values—ink or no ink in the case of an offset printing press. The continuous-tone illusion is created by the placement of small printing elements, known as halftone dots. When screening is done through digital operations, it is sometimes called digital halftoning. Thus, "digital halftoning" shall refer to such digital screening herein.

The way the digital artwork determines the plate is straightforward in areas where the digital artwork is blank (no ink needed, 0% fill) or fully filled (100% fill). Where it is blank, the plate will be fully ink repelling and where it is fully filled, the plate will normally be fully ink receptive. In all other cases, screening typically is used to obtain the desired appearance on the final printed result.

In some of the prior art, traditionally, the screening process places halftone dots centered on a square grid determined by a fixed angle and a fixed periodicity. The periodicity sometimes is expressed as the ruling, which is frequently expressed as a number of dots per inch (dpi), and sometimes also as the number of lines per inch (lpi) since the dots are usually arranged in lines. Density variations are achieved by changing the size of the halftone dots while the number of halftone dots in a given area is the same for high densities as for low densities. For example, 10% and 50% density regions have the same number of halftone dots but the area of a 50% dot is 5 times larger than the area of a 10% dot. This kind of screen is known as the "classical screen." The technology of classical screens is very popular and covers currently more than 95% of the printing business. Variation of the size of the halftone dots in digital halftoning for classical screens is done by varying the number of black pixels making the halftone dot.

FIG. 2 shows a gradation of a classical screen 201 and is thus labeled "Prior Art."

In classical screening, whether done digitally or not, the angles and periodicity of the square grid of dots are determined by technical considerations. For example, color printing involves printing in several colorants (inks), and several plates are prepared, one for each ink. These are called color separations. Printing is achieved by overlaying the different colors. Different angles are used for each separation to avoid moiré when overlaying the different printing colors. Rulings are determined by the process parameters such as substrate quality, ink viscosity, press characteristics and so on. Generally, one tries to use a ruling as high as possible to achieve the best image sharpness, taking care, however, not to exaggerate the ruling in order to avoid technical problems on the press.

Producing good quality printed material with an offset process is not an easy task. As is known in the printing industry, there are many problems which affect the quality of the final printed result, some even making printing impossible. The following is an incomplete list of some of the important problems.

- substrate feeding problems causing press stops, bad quality or excessive waste of substrate;
- density variations (e.g., too dark, too light, moiré patterns, etc.);
- drying problems (e.g., ink dries too early or too late);
- ink water balance (e.g., too much water, not enough water, etc.); and
- inking problems (e.g., too much ink, not enough ink, ink on wrong places, etc.).

All such problems have in common that they diminish the quality of the produced printed material or the productivity of the press or increase the waste of substrate.

One of the choices one has to make for an offset printing is selecting the ink. On an even, high quality substrate, one can choose a strong, concentrated ink, with a brilliant aspect. By nature, strong inks typically are very sticky (high tack) and pull on the substrate during printing. When used on lower quality substrates, which are weaker or may have a rough surface, strong inks tend to pull particles away from the surface of the paper. Moreover, forces which pull on the substrate itself can cause shifts of the substrate in the press, and can lead to register problems or dot slur and even dot doubling. In an extreme case, the substrate can remain sticking on the press blanket and cause a paper jam, which unavoidably causes a press stop. On a web press, the web can beat due to the substrate which first sticks to the blanket, then gets pulled off by the web. This causes a dirty printed result. The operator typically solves this problem by making the inks "softer", through the use of additions to the ink or the water, or by choosing softer inks supplied by ink manufacturers. As a result, dot gain can increase and the final result will be less brilliant. Moreover, the press will typically be run with too much water. The printing results will be pale. There is also an increased risk that moisture may enter the ink rolling system. When this happens, ink and water make a mixture which introduces quality problems and causes the ink rolling system to require more frequent cleaning.

The printing industry has been searching for solutions to these problems for a long time. Over the years, printing presses have improved in quality and degree of control, new ink types have been developed, and substrate manufacturers have delivered higher quality substrates and products of more consistent quality.

An important consideration in printing is the printing plate itself. Depending on the nature of the image on the printing plate, the above mentioned problems exist to a greater or lesser extent. There is thus an economic incentive to define imaging methods that produce printing plates which guarantee less troublesome printing.

As would be clear to those of ordinary skill in the art, a film often is used to make an offset plate, and whatever characteristics are required in the offset plate, corresponding characteristics also would be required in the film, the correspondence depending on whether the film is positive or negative. Thus, it is to be understood that the word "offset plate" when used hereunder means the offset plate and/or the corresponding film for making the offset plate for the case that such a film is used.

The term "exposure" here is used to describe the physical process of making a plate. When a film is involved, the term exposure is the process of exposing a photosensitive plate with radiation through the film. For direct computer-to-plate processes, the term exposure is the output of the computer data to the plate, for example using a raster scanning laser or other computer-to-plate methods.

The most common method of improving printability through the nature of the image on the printing plate is by reducing the ruling of halftones. Lower rulings make bigger dots. As a result, process variations have a smaller influence on the density of the final printed result. Popular rulings are 133, 150 and 175 lines per inch (lpi) for high quality presses on quality paper, 80, 100 or 120 lpi for work on difficult substrates such as plastic or highly absorbent paper, and even lower lpi values, for example, for newspaper printing, where substrates are cheap and presses must run at very high speeds. An important disadvantage of lower rulings is loss of sharpness.

Another way of influencing printability through the properties of the printing plates is described in published French patent, publication number 2 660 245, to Nouel, publication date Oct. 4, 1991, entitled *Plaques ou clichés destinés à l' impression, procédé pour leur préparation, films ou caractères utiles à leur préparation, leur utilization en imprimerie*, (translated to "Plates for a printing press, methods for their preparation, films or characters used in their preparation, their use in printing"), incorporated herein by reference, and in published international (PCT) patent application number WO 96/02868, also to Nouel, publication date Feb. 1, 1996, entitled *Use of frequency-modulated screening for lightening offset printing surfaces*, and incorporated herein by reference. These patents (hereinafter "Existing Nouel Patents") state that better printing results are easier to achieve on the press when the printing surfaces which receive ink contain small ink repelling parts. These ink repelling parts are small because it is intended that during printing, the areas will be filled-in with ink. This is in contrast with the normal ink repelling zones in an offset plate, which, after printing, normally would be blank. In this document, these small ink repelling parts shall also sometimes be called perforations.

The Existing Nouel Patents describe a method to include perforations in an offset plate through the following steps, which involve traditional production of offset plates via exposing light sensitive plates through a corresponding film:

1. Take a normal offset plate, in this case a positive offset plate. The term positive offset is used for a light sensitive offset plate (exposed using a corresponding film) which will be ink repelling where it is exposed to light.
2. Expose the offset plate through the positive corresponding film containing the image.
3. Expose this same plate a second time through a second film, which is completely opaque, except for a number of white spots, typically comprising approximately 10% of the surface. Measured by a densitometer, this film will have a density of around 0.9 D on average. The sizes of the perforations typically are in the order of 25 microns square.
4. As a result of the second exposure, the parts of the image which were not ink repelling after the first exposure and which were exposed to the light in the second exposure because they were under one of the white spots in the second film, will now also become ink repelling.

Many variants are possible:

One can add perforations with an analogous process for negative plates.

The number and the nature of the perforations can vary. Typically, more perforations are added for newsprint, i.e., newspaper paper types (perforations are added to up to 20% of the surface) than for high quality paper types (typically below 8% of the surface). The perforations are around 25 by 25 microns square in size, but these can be made smaller or larger depending on the nature of the printing process, the press, the printing inks, paper stocks, etc.

Distribution of the perforations can follow a classical screen, or more typically, a stochastic screen. Stochastic screening, also called random or frequency modulated (FM) screening, keeps dot size constant, but varies the number of dots per unit area in order to simulate continuous-tone changes in gray-scale. This is different from a classical screen, in which halftone dots are placed on a regular grid at some angle and in which the size of the halftone dot is varied to simulate continuous-tone changes.

The method produces the following advantages in printing:

The use of the perforations allows higher quality printing than conventional methods with a more consistent ink and water deposit, especially in dark areas;

Printing is made easier where large areas of 100% ink are in proximity to areas using less ink, for example less than 10%, due to the implicit regulation of the water deposit;

Stronger inks with more tack can be used for more paper stocks;

Lower ink consumption is obtained;

Faster press set-up is achieved because fewer registration problems occur, and because the ink/water balance is less critical than in conventional offset printing;

Ink sticks less on the press blankets, and therefore, washing the blankets is made easier; and The undesirable effects of tacky inks are diminished when such inks are used in waterless offset printing. Waterless offset printing typically requires inks that are extremely tacky, otherwise, the plate does not take the ink in the correct way. As a result, low quality paper is difficult to print on a waterless offset press. Perforations make it possible to produce acceptable printed results on low quality paper with waterless printing methods.

Most of these advantages are typically very important on bad or old presses, or when substrates or inks have low quality. In other words, perforations allow for higher quality with cheaper material.

The main problem of the perforations method in the prior art is in the way the perforations are added:

Additional steps in the pre-press flow are needed. At the minimum, an additional exposure is required, for example involving producing an additional film. Any additional steps take time and require: additional material, skilled people and, when putting two physical image carriers on top of each other is involved, a good vacuum in the copy frame;

The additional film is delicate and can diminish the final plate quality;

When positive plates—plates on which the parts exposed to light become ink repelling—are produced by a direct computer-to-plate process, the plate has to be exposed twice before processing. This double exposure makes automation of the process difficult. Typically, computer-to-plate imagesetters are automated to take a plate from a cassette, expose it once and feed it directly to an on-line processor;

When negative plates, plates on which the parts exposed to light become ink receptive, are produced by a direct computer-to-plate process, there is no simple method to integrate the perforations into the plates. One possibility would be to fabricate plates which have perforations on certain spots no matter whether they are exposed to light or not; and Since perforations are typically added through a manual process of putting two physical image carriers on top of each other, there is little control over the placement of the perforations.

Thus there is a need in the art for an offset plate with perforations that is produced with one exposure and by a method that enables overcoming many of the disadvantages mentioned above.

SUMMARY OF THE INVENTION

Objects of the Invention

Thus, one object of the present invention is an offset plate with perforations, each part of the offset plate produced with a single exposure. It is a further object of the invention to provide a method and apparatus for producing halftones with perforations. It is also an object of the present invention to provide a method and apparatus for producing digital halftones with perforations. It is a further object of this invention to provide a method and apparatus for producing digital halftones with perforations, the method allowing control of the placement, size, shape and distribution of the perforations.

Overview of the Invention

These and other objects are provided for in the present invention. One aspect of the present invention is an offset plate with perforations, each part of the offset plate produced with a single exposure. Another aspect is a method and apparatus for producing digital halftones with perforations. Another aspects of the invention is a method and apparatus for producing digital halftones with perforations, the method allowing control of the placement, size, shape and distribution of the perforations.

Another aspect of the invention is a method for producing digital halftone screen masters with perforations. Another aspect is using such screen masters to screen continuous-tone (CT) and linework originals to generate screened versions with perforated screening, the perforations inherent to the master screens. When such screening are used in an imagesetter, any films coming out of the imagesetter have perforations already included. Thus, exposing the plates need not take longer than if a classical screen were used. When such screening is used with a computer-to-plate system, the plates come out ready for the press, without requiring an additional step to add the perforations.

One embodiment disclosed includes a method for producing a supercell threshold array which includes perforations. Another aspect is using a perforated supercellcell threshold array for screening in the same manner as any supercell threshold array. The preferred embodiment of the method for generating the perforated threshold array starts with an original non-perforated threshold array. Perforations are added to this original threshold array. In several alternate aspects, alternate methods are disclosed for adding the perforations to the original. One such method includes generating a stochastic binary pattern of perforations using a threshold array for stochastic screening, the stochastic threshold array having the same mathematical properties as the original threshold array.

Another aspect of the invention is a method for producing, instead of a perforated supercell threshold array for screening, a set of bitmaps for screening using a bitmap lookup table screening method, the bitmaps including perforations. Thus another aspect of the invention is screening using such perforated bitmaps. Screening with such perforated bitmaps provides a degree of control of the perforations.

Another aspect of the invention is a method for adding perforations to pre-screened (bi-level) originals, the adding carried out as a computer implemented pre-processing step. The preprocessing step automatically erases pixels in the existing bitmap to produce perforations, and is preferably implemented as a digital filter.

Yet another aspect of the invention includes starting with a page description, for example, a page description in the PostScript® language, the page description in one embodiment being of the final plate, or in another embodiment of source files which then may be used to compose the image to make the final plate. Perforations are added to the page description as a bitmap perforating layer on top of all the graphic elements in the page description.

It should be clear that although some of the descriptions will be for producing a single plate, the invention is applicable to producing either a single plate for monochrome printing, or a set of plates for color printing.

Other aspects of the invention will become clear from the detailed description and from the claims.

BRIEF DESCRIPTION OF THE DRAWINGS

FIG. 8 shows the effect on the quality of text of applying activity rules to the perforations pattern when using the second alternative embodiment of the invention.

DESCRIPTION OF THE PREFERRED EMBODIMENT

Implementation on a Computer

The various embodiments of the method of the present invention are methods implemented on a computer. The steps of each such method are performed by the computer executing a software program. It will be recognized by those of ordinary skill in the art that the invention may be carried out other than on a computer executing a software program. For example, one could use special purpose hardware.

Figure 1:
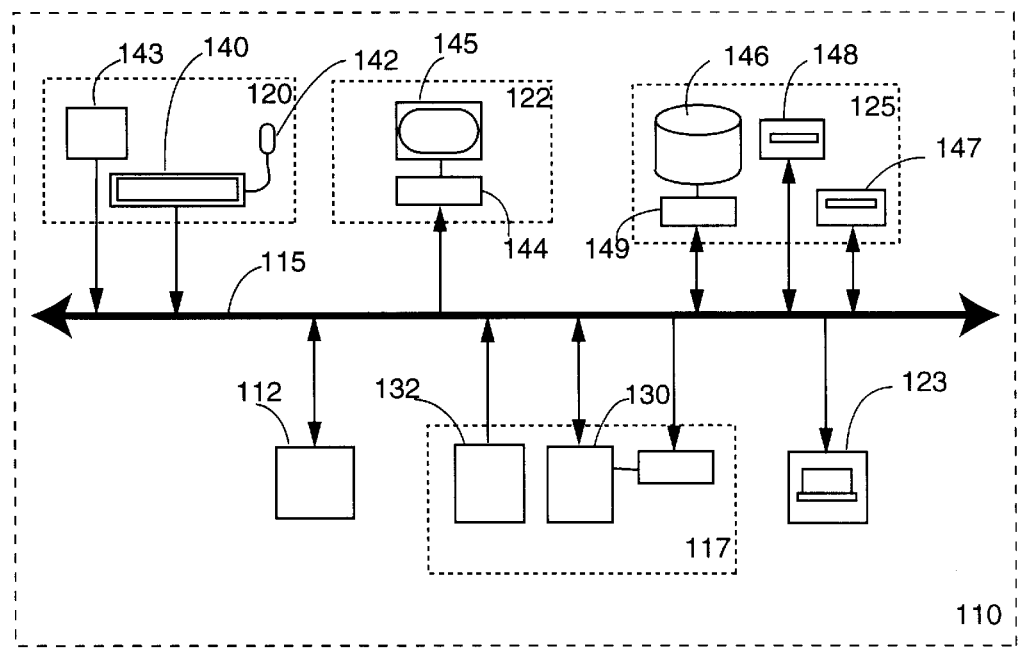
FIG. 1 is a block diagram of a typical computer system in which the present invention may be embodied (Prior Art)
Figure 2:
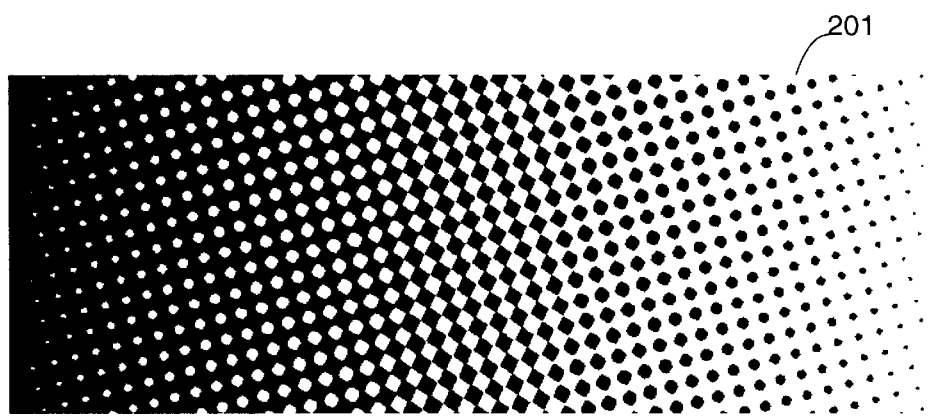
FIG. 2 shows a gradation of a classical screen (Prior Art)

FIG. 1 is a simplified block diagram of a computer system 110 in which the present invention may be embodied. The computer system configuration illustrated at this high level is standard, and as such, FIG. 1 is labeled "Prior Art." A computer system such as system 110, suitably programmed to embody the present invention, however, is not prior art. The specific embodiments of the invention are embodied in a general-purpose computer system such as shown in FIG. 1, and the remaining description will generally assume that environment. However, the invention may be embodied also in dedicated devices such as printer servers, and printer controllers, and these devices may include many of the elements that also are in a general computer system such as computer system 110.

In accordance with known practice, the computer system includes a processor 112 that communicates with a number of peripheral devices via a bus subsystem 115. These peripheral devices typically include a memory subsystem 117, a user input facility 120, a display subsystem 122, output devices such as a printer 123, and a file storage system 125. Not all of these peripheral devices may need to be included for all embodiments of the invention.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of personal computers (PCs) and workstations.

Bus subsystem 115 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system or an embedded controller.

Memory subsystem 117 includes a number of memories including a main random access memory (RAM) 130 and a read only memory (ROM) 132 in which fixed instructions are stored. In the case of Macintosh-compatible personal computers this would include portions of the operating system; in the case of IBM-compatible personal computers, this would include the BIOS (basic input/output system). In some embodiments, DMA controller 131 may be included. DMA controller 131 enables transfers from or to memory without going through processor 112.

User input facility 120 typically includes a keyboard 140 and may further include a pointing device 142 and a scanner 143. The pointing device may be an indirect pointing device such as a mouse, trackball, touchpad, or graphics tablet, or a direct pointing device such as a touchscreen incorporated into the display.

Display subsystem 122 typically includes a display controller 144 and a display device 145 coupled to the controller. The display device may be a cathode ray tube (CRT), a flat-panel device such as a liquid crystal display (LCD), or a projection device. Display controller 144 provides control signals to the display device and normally includes a display memory (not shown in the figure) for storing the pixels that appear on the display device.

The file storage system 125 provides persistent (non-volatile) storage for program and data files, and typically includes at least one hard disk drive 146 and at least one floppy disk drive 147. One or more of the disk drives 146 may be in the form of a random array of independent disks (RAID) system. The disk drive 146 may include a cache memory subsystem 149 which includes fast memory to speed up transfers to and from the disk drive. There may also be other devices such as a CD-ROM drive 148 and optical drives. Additionally, the system may include hard drives of the type with removable media cartridges. As noted above, one or more of the drives may be located at a remote location, such as in a server on a local area network or at a site on the Internet's World Wide Web.

Main Aspect: Plate with Perforations

The various embodiments described herein are for making offset plates (and/or films for making plates), the plates including microscopic ink repelling areas (perforations). Such a plate may be any positive or negative plate. A desirable perforation would have an extent (e.g., a diameter) between about 3 microns and about 80 microns. Typically some area of the plate, for example, an area of at least 1 square inch of the plate, may be fully ink receptive or fully ink repelling. The plate material can be any material including aluminum, paper, polyester, steel, etc., and the plates can be light sensitive (any wavelength) or thermal sensitive, or sensitive to some other means for exposing.

Thus, it is to be understood that the word "offset plate" when used hereunder means the offset plate and/or the corresponding film for making the offset plate for the case that such a film is used.

The term "exposure" here is used to describe the physical process of making a plate. When a film is involved, the term exposure is the process of exposing a sensitive plate with radiation through the film. Plates used in direct to press engines are also included, as are plates for waterless offset printing. For direct computer-to-plate processes, the term exposure is the output of the computer data to the plate, for example using a raster scanning laser or other computer-to-plate methods.

As would be clear to one of ordinary skill in the art, adding perforations to some plates might not be practical. For example, pre-perforated offset plates are possible, which have some non-exposable microscopic areas (e.g., between 3 microns and 80 microns in extent) which will become ink repelling no matter how they are exposed.

An ink repelling area as used herein includes an area on the plate which is much less ink receptive than the ink receptive areas of the offset plate. For example, this might be an area which is less ink receptive than the ink receptive areas by a factor of 10 or more. An ink repelling area as used herein, however, does not include the white areas which are generated by a classical screen or stochastic screens in high density areas, for example, above 90% density for a classical screen, or above 70% density for a stochastic screen.

In practice, there may be many ways to achieve ink non-receptiveness. It may be due to real physical or chemical repelling or due to a lack of ink reception, for example caused by a lack of contact to an ink dispensing device. In describing adding perforations, it will simply be stated that "white" areas are generated in the output. It will be understood by those of ordinary skill in the art that these white areas may then be translated into areas that are unexposed (for either offset plates or films, where exposed dots generate ink receptive zones), or exposed (for those plates or films where exposed dots generate ink repelling zones).

Based on experience, it has been found that effective perforations are approximately between 10 and 35 microns in diameter, although other sizes are possible within the scope of the invention. Also based on experience, the method of producing perforated plates should ensure that each ink receptive zone of at least 200×200 microns should contain at least one perforation.

Three Main Embodiments

The Workflow

A typical prepress workflow starts with an original design which these days typically includes a layout (a "page description") in the form of a set of page description instructions in a page description language ("PDL") such as PostScript® from Adobe Systems Inc., Mountain View, Calif., the most popular PDL today, or in a format such as GRO™ (GRaphic Objects), the native internal format used by Barco Graphics NV of Gent, Belgium, the assignee of the present invention. The layout may have been output from a page layout program such as QuarkXpress® (Quark, Inc., Denver, Colo.) or from other desktop publishing or professional publishing programs. The main page description file may include references to artwork (linework or CT images) to be placed ("stripped") in the right location in the final page. In some cases, the artwork may be other computer files, and in other cases, the artwork may be supplied separately, either as separate digital files, or as film. A typical example situation where the artwork may be supplied separately is in magazine production. A typical magazine consists of the editorial information, including editorial text and editorial images, and advertisements. The editorial information might be supplied digitally in the form of page descriptions, and the advertisements might be supplied separately as film or separate digital files, typically bitmap files for each color. These advertisement images are stripped into the pages.

For offset printing, the page descriptions are processed by a raster image processor ("RIP") for output to an imagesetter in the case of film output, or a platemaker, in the case of a computer-to-plate system. The separate images may be in the form of bitmap files or film. If the images are supplied as film, these films may be scanned in high resolution. This is necessary, for example, in computer-to-plate systems. In any case, the inclusion of the separately supplied images is done separately from the standard RIPing of PDL data.

One aspect of the present invention is producing a plate with perforations, the plate produced with a single exposure (see above for the definition of "exposure"). According to some of the different aspects of the present invention, the perforations can be added to the data for output at three different points in the prepress workflow. These correspond to three main alternative embodiments of the method of the present invention, described herein.

1. The perforations can be added by using a special halftoning process that inherently includes perforations, the halftoning process, for example, being part of the RIPing process.
2. The perforations can be added to the result of the RIPing process. The result of a RIPing process is typically a bitmap which can be written in a file or be sent directly to an output device. Adding the perforations can be achieved by processing a bitmap file or by processing a RIP output sequence of bits in, for example, a RAM buffer, through setting selectively bits in the bitmap to 0 (0 in such a case indicating no image).
3. The perforations can be added before RIPing as operations on the page description of the original design;

Although only these three alternatives are described in detail herein, other alternatives for producing a plate with perforations, the plate produced with a single exposure, would become clear to those of ordinary skill in the art. The choice between these methods is dependent on the user's workflow, the user's equipment and on the quality requirements. In some cases, a combination of different methods will be chosen.

Example: Suppose a plate intended for printing a magazine, containing a number of pages with editorial information (given as a page description) and some advertisements. As is often the case, the advertisements are provided as films. When the plate is to be made through a computer-to-plate process, the advertisements will probably be scanned in on a pixel scanner in high resolution (typically the resolution of the output device). In some workflows, these scanned parts will not pass the rasterizing (that is, RIPing) software any more. They can be composed with the rasterized result of the editorial information at the latest possible moment. This process is known as a kind of late binding. Within this workflow, the perforations will be added through a special screen for the editorial information and through a bitmap operator (the second alternate embodiment of the above) on the scanned image. The perforated results will be bound with procedures known to those of ordinary skill in the art.

Digital Halftoning to Produce a Perforated Screen

Figure 3A:
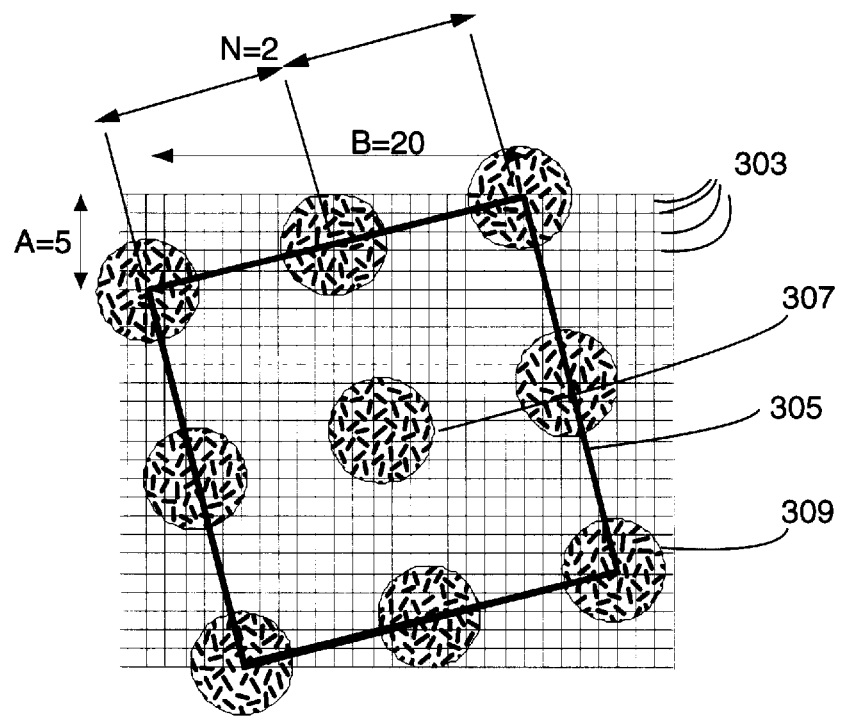
FIG. 3(a) illustrates the case where the halftone dots are in the direction of the repeating square tile (Prior Art), and 3(b) illustrates the case where the halftone dots are pre-angled with respect to the repeating square tile (Prior Art)
Figure 3B:
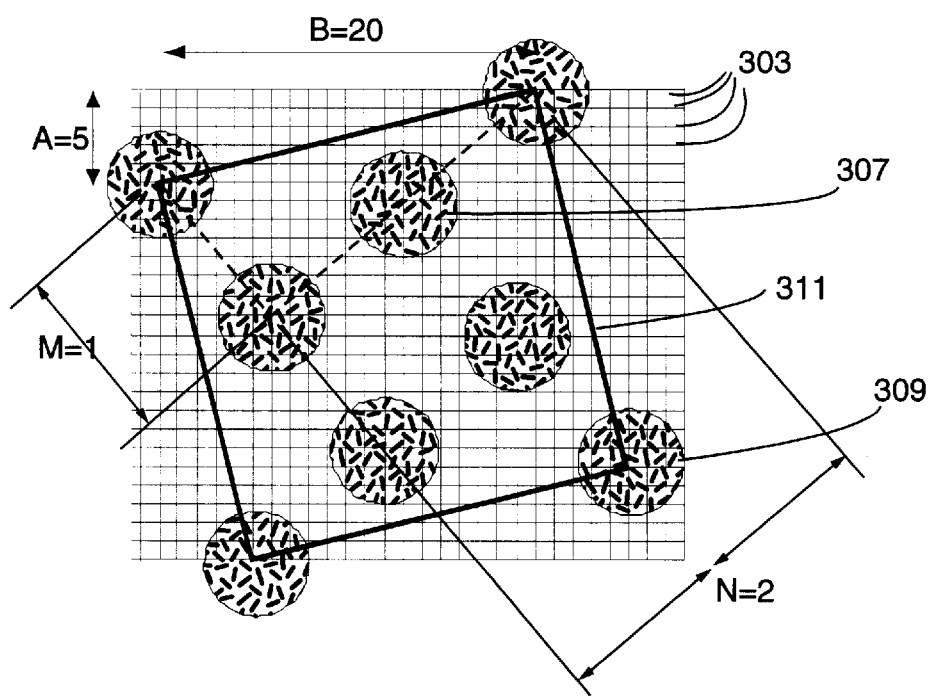
FIG. 3 shows a supercell.

The first alternative embodiment describes the process of including perforations through the use of a screening (digital halftoning) method that inherently includes the perforations In one aspect, the generation of perforations in the digital halftone is done at the level of generation of a repeating screen supercell. For the remainder of the description, we define a supercell as follows, with the aid of FIG. 3. Two versions are shown in FIG. 3(a) and 3(b), respectively. For each screen, a big repeating tile, indicated by square 305 in FIG. 3(a), and square 311 in FIG. 3(b), respectively, is defined through two integer numbers A and B. The vector (A, B) is the vector from the top left corner to the top right corner of the square. The small grid 303 indicates the fundamental resolution, i.e., the pixel size of the output device, e.g., an imagesetter, and A and B thus are measured by a number of pixels.

Halftoning using a supercell is known in the prior art, but not halftoning that includes perforations. FIG. 3 therefore is labeled prior art, and is prior art when no perforations are intentionally present in the results. First consider FIG. 3(a). The square defines a repeating tile 305, and some of the pixels within the tile 305 are rendered black, while others are light. The dark pixels, for example, may form a set of halftone dots, and one such halftone dot is labeled 307. Another is labeled 309. Halftone dot 307 is completely within tile 305, while only part of dot 309 is within the tile. The remaining parts of dot 309 are generated by the neighboring repetitions of tile 305. Tile 305 is thus filled with complete and partial halftone dots, and is called a supercell. Repeating the supercell in both directions fills an image (the output film or plate) with a complete halftone pattern.

FIG. 3(a) shows one variation of a supercell. The halftone dots in the tile are placed parallel to the direction of the tile defined by vector (A, B). In this case, A=5 and B=20, as shown. The halftone dots are along an angled regular grid at some period, and the number of periods along any side of the rectangle 305, is an integer, denoted by N. In the example shown, N=2. A supercell of this type is characterized by three numbers: A, B and N., which are each an integer. A and B define the angle and the size of the supercell, while N defines the linear number of halftone dots per supercell.

The following formulae hold for the resulting screen:

$$period = \frac{\sqrt{A^2 + B^2}}{N} \text{ in pixels,}$$

$$ruling = \frac{resolution}{period} = \frac{(ppi) * N}{\sqrt{A^2 + B^2}} \text{ in lines per inch, and}$$

$$angle = \arctan\left(\frac{A}{B}\right).$$

The resolution, denoted ppi, is the number of pixels per inch, and the angle is measured counterclockwise from the horizontal.

Another type of supercell, shown in FIG. 3(b), does not have the halftone dots placed in the direction of the repeating tile, but pre-angled to the tile. The corners of the tile, however, are still at the centers of halftone dots. The angle of the halftone grid to the tile is given by two integer numbers M and N, which are obtained by drawing a right-angle triangle with vector (A, B) as the hypotenuse, one side going down and to the right from the top left hand corner of the tile, and another side going down and to the left from the top right hand corner of the tile, these sides passing through the centers of the halftone dots and meeting at a right angle. Integer M is the number of halftone dot periods of the side from the top left tile corner to the right-angle, and integer N is the number of halftone periods of the side from the top right tile corner to the right angle. In the example of FIG. 3(b), M=1 and N=2. The angle of the halftone dots to the supercell tile is arctan(M/N). The supercell of FIG. 3(a) may be considered a special case (M=0) of the same type of supercell as shown in FIG. 3(b).

Such supercells are thus defined by the four numbers A, B, M and N. These type of supercells (but without perforations) are known in the prior art. See, for example, U.S. Pat. No. 5,155,599 to Delabastita issued Dec. 15, 1992 and entitled METHOD FOR FORMING HALFTONE SCREEN AND APPARATUS THEREFOR, incorporated herein by reference. The formulae for such a supercell are:

$$period = \frac{\sqrt{A^2 + B^2}}{\sqrt{M^2 + N^2}} \text{ in pixels,}$$

$$ruling = \frac{resolution}{period} = \frac{(ppi) * \sqrt{M^2 + N^2}}{\sqrt{A^2 + B^2}} \text{ in lines per inch,}$$

and $$angle = \arctan\left(\frac{A}{B}\right) + \arctan\left(\frac{M}{N}\right).$$

By making good choices for A, B, M and N, one can define many screens with interesting rulings and angles.

Supercells can be used several ways for screening, producing results that give the same angles and rulings, but different properties with respect to the imaged densities. Two ways are described.

The most general way of using supercells is to produce a set of bitmaps: for each density, a bitmap with the size of a supercell is held in memory. Screening is then performed by the following computer implemented steps:

determining from the original image the wanted output density at the current location;

selecting the bitmap corresponding to this density from a set of predetermined bitmaps;

selecting within this bitmap, the pixel corresponding to the current location copying this pixel (a bit, which has value 1 or 0) to the output.

This method is sometimes called font-look-up, as it is analogous to the way characters are copied from a font to produce text. It shall be called bitmap lookup table screening herein.

The second method, using so-called threshold arrays, may be considered a special case of the bitmap lookup table screening method. Threshold arrays are sometimes called dither arrays. Using threshold arrays has the limitation that when a pixel is black for some density, say a, the pixel at that location will be black for all densities higher than a.

With this threshold array limitation, it is possible to produce a fast screening method using considerably less memory than the bitmap lookup table screening method. Instead of having a number of bitmaps, one for each possible input density, only one array of numbers is constructed and stored. When a tile, for example a supertile, is used, the array has the size of the tile (the tile size is determined by the numbers A and B. In the case of a supertile, the numbers M and N deal with other aspects of the supertile), and each number in the array corresponds to the lowest input density which will produce a black output (i.e., output pixel bit=1). This density is called the threshold, and the tile (e.g., the supercell) containing the values is called a threshold array. When supercells are so used, the threshold array is repeated to cover the whole output space (for example, the full film or full plate).

Screening is then performed as a process comprising the following steps—usually computer or special hardware implemented—for each pixel of the output bitmap (see also U.S. Pat. No. 5,235,435 to Schiller, issued Aug. 10, 1993, incorporated herein by reference, and entitled METHOD OF PRODUCING HALFTONE IMAGES):

Determining the position in the threshold array for the current pixel;

Comparing the wanted density value on that position (determined by the original image) with the value in the threshold array on the calculated position. Note that one should take care that both values refer to the same range. If the threshold array contains n steps, the density values should be reduced to a value between 0 and n; and If the wanted density is larger than the threshold value, setting the output pixel to 1, else setting the output pixel to 0.

Most modern (circa 1997) high quality screening systems are based on the threshold array principle, although bitmap lookup table screening is more general and allows for better quality. The cost of the amount of memory needed with bitmap lookup table screening is becoming reasonable as RAM memory prices continue to drop.

Digital Halftoning with Perforations

Adding perforations to the final output can be done by adding or incorporating perforations into a threshold array or into a set of bitmaps, so that either thresholding or bitmap lookup table based methods can be used. The following describes mainly how to add perforations to a threshold array. Once one has such a "perforated" threshold array, it is a simple matter to generate a set of bitmaps by using the perforated threshold array on each input density of the set of input densities for which bitmaps are desired, the resulting output from using the perforated threshold array being the screening bitmap to use.

Generating Threshold Arrays with Perforations

One embodiment for generating threshold arrays with perforations involves adding perforations to a threshold array and comprises the following steps:

1. Start with a normal threshold array. One can use a classical screen threshold array, a classical screen threshold array with the classical screen known to produce results free of second order moiré interference when used for color printing, or many other threshold arrays, as would be clear to one of ordinary skill in the art. Producing a screen known to be free of second order moirés is discussed, for example, in above mentioned U.S. Pat. No. 5,155,599 to Delabastita;

2. Select the type, number and position (i.e., the distribution) of the perforations;

3. For each perforation, set the corresponding matrix elements in the original threshold array to a special value to produce a modified threshold array. Typically, this value will be higher than the maximum value in the original threshold array. The maximum value in the threshold array could be the number of pixels per screen dot for 100% black or some predefined number like 200 or 255. If, for example the highest possible value in the original threshold array is 200, one could use the value 201. As a result, the corresponding pixels in the final output will never be turned black, even at 100% input; and 4. Use the modified threshold array (also called the "perforated threshold array" hereinafter) in the same way as the original threshold array.

The Type of Perforations

The type of perforations to use is dependent on the printing process and the imaging process. See the above discussion under "Main Aspect: Plate with Perforations" for some of the desired properties. This also is discussed in the Existing Nouel Patents. It is required that the perforations should fill in when printing with the particular printing process used. As a result, printing processes with high dot gain may use larger perforations than printing processes with less dot gain. Practice proves that the perforations mostly should be bigger to obtain maximum advantage from the perforations. Depending on the preferred size of the perforations (for example, in microns), one should choose a configuration which can be made with the resolution of the particular imagesetter to be used. Using more pixels per perforation will make bigger perforations, typically for processes with more dot gain or when the imagesetter resolution becomes higher.

The number of perforations is preferably determined by the following formula:

$$\text{number\_of\_perforations} = \frac{npix * \text{perforation\_factor}}{\text{npix\_in\_perfo}} \quad \text{Eqn. (1)}$$

where npix is the number of pixels in the repeating threshold array (supercell), perforation_factor is the area covered by the perforations divided by the total area, and npix_in_ perfo is the "area" of one perforation, measured as the number of pixels in a perforation.

As an example, consider using a threshold array determined by two numbers A, B with A=30 and B=120. Then npix=A*A+B*B=15300. One selects the perforation factor according to the printing process. Suppose we want to print on medium quality paper, asking for 12% perforations. Then the perforation factor is 0.12. If we want to expose at 2000 ppi, we can choose perforations of around 25 microns by choosing perforations of a square of 2 pixels per side. Then npix_in_perfo is equal to 4. Applying Eqn. (1) with npix_ in_perfo=4 leads to:

number_of_perforations=15300*0.12/4=459 perforations.

The Distribution of the Perforations

The position or distribution of the perforations can be determined by several methods, some of which are described below. Different ways of placing the perforations result in different properties. In the following discussion, several alternative methods with specific advantages are disclosed.

Alternative 1: The Perforations are Randomly Distributed

Randomly distributed perforations have no predefined properties. There is no guarantee that the perforations are isolated one from another. When two perforations touch, they form a bigger hole, which might not fill in as required, leading to a white dot visible on the printed result. Using a supercell, such white dots will occur randomly within the supercell, but as the supercell is repeated, so will the white spots repeat.

Alternative 2: The Number of Perforations per Halftone dot is Fixed

In this method, one determines a fixed average number of perforations per halftone dot (also called screen cell). We call this fixed number nperfo_cell. The preferred method of calculating nperfo_cell is straightforward for the supercells defined by A, B, M and N as described above:

$$\text{nperfo\_cell} = \frac{\text{number\_of\_perforations}}{\text{ncells}} \quad \text{Eqn. (2)}$$

$$\text{ncells} = N^2 + M^2 \quad \text{Eqn. (3)}$$

In Eqns. (2) and (3), ncells is the number of halftone dots (screen cells) in the supercell. When the dots are in the direction of the supercell, M=0.

This method guarantees that every halftone dot is perforated to the same extent. The position of the perforations within the halftone dot could be fixed or variable. Fixed means that the perforations are placed in the same configuration with respect to the center of gravity of the dot for all dots of the supercell. Variable means any other configuration, so that each dot may appear different. In both cases, one should take care to keep the perforations separated by at least one or two regular pixels to avoid clustering of perforations into bigger holes.

As the supercell repeats, it is advisable to place the perforations in such a way that the repetition is not visible on the film, because even when the perforations fill in, they still will have influence on the printed result. In fact, that is the very reason one uses perforations. It is desired to spread this influence out over the plate evenly, preferably as evenly as possible.

Alternative 3: The Perforations Follow a (Repeating) Stochastic Pattern

Stochastic screening using threshold arrays is known in the art. It is also known to those skilled in the art that it is possible to make a stochastic screen threshold array with the same mathematical properties as a given original classic screen threshold array, for example, one using an (A, B) supercell as described above, where the two threshold arrays (the original screen threshold array and the stochastic screen threshold array) share the same values of A and B. One can now produce a perforations pattern by first thresholding a constant density value image with the stochastic threshold array to produce a bitmap with the same size as the threshold array and having a pattern of pixels of values 1 and 0. For example, if it is desired to have 10% perforations on a supercell based classic threshold array designed for 256 possible input values, then one would use a stochastic screen threshold array with the same (A, B) as the classic threshold array on an image of input level 25 or 26. Assuming that the stochastic screen was designed to avoid or minimize visibility of repetitions, when the binary stochastic pattern repeats, the repetition is not or is hardly visible. Methods of designing stochastic screens which so avoid visibility of the repetition are known in the art. Since the stochastic binary pattern and the original classic screen share the same mathematics (that is, the classic screen threshold array and the stochastic binary pattern repeat with the same angle and frequency), each matrix element from the classic screen threshold array has a counterpart in the binary stochastic pattern. Perforation is now carried out by making the classic screen matrix elements invalid if the stochastic binary pattern counterpart is set to 1. The result is a new threshold array.

Figure 4A:
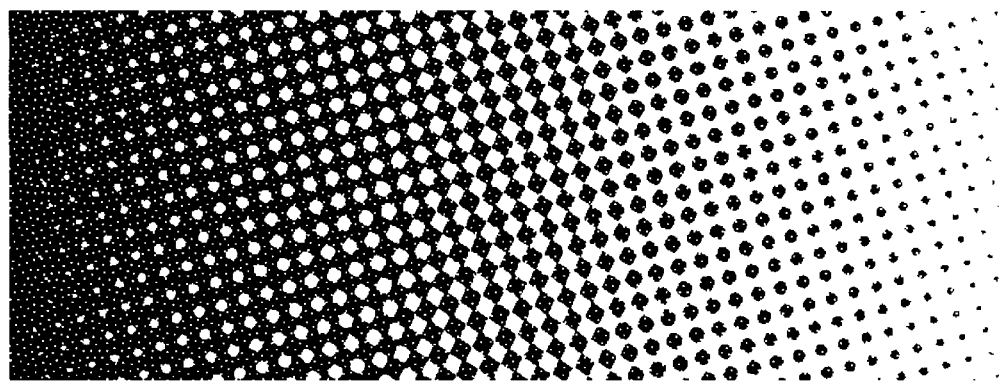
FIG. 4(a) illustrates a gradation screened with a threshold array containing perforations produced according to an embodiment of the invention.
Figure 4B:
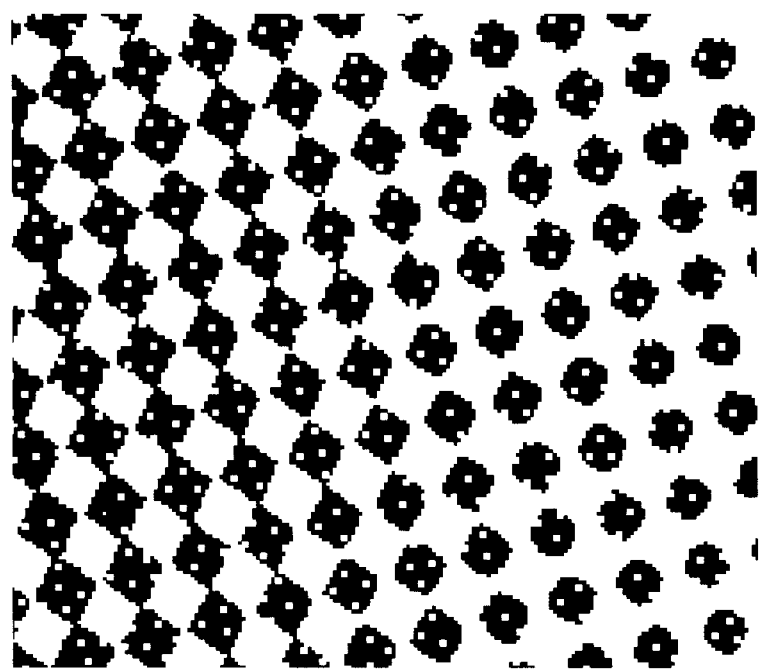
FIG. 4(b) illustrates an enlarged part of the gradation shown in FIG. 4(a)

FIG. 4(a) show a gradation screened with a modified threshold array determined by the preferred embodiment of this method. FIG. 4(b) illustrates an enlarged part of the gradation shown in FIG. 4(a). In this preferred embodiment, perforation sizes are 1 by 1 pixel for all output resolutions under 1200 ppi, 1 pixel by 2 pixels for resolutions between 1200 and 2000 ppi, 2 pixels by 2 pixels for resolutions between 2000 and 3000 ppi, and so on. To generate the perforations, stochastic threshold arrays for clustered dot stochastic screening (also called clustered, non-ordered screening) are used, which lead to a stochastic repeating pattern of clusters of pixels (the perforations). Thus, for output resolution of 2500 ppi, the clusters are two pixel by two pixels.

Note that if an original fully filled at 100% is screened with such a modified threshold array, the result will be the reverse of the stochastic binary pattern. This is an important desirable property. It is an objective of using perforations to improve the print quality and printability of large black areas. Therefore, when printing using offset, ink and water should be distributed evenly over the surface. Since the perforations influence the ink and water distribution, they should be evenly distributed and separated. If perforations are badly distributed, the final print can have a cloudy aspect.

Improving the Perforations' Repeating Stochastic Pattern

Figure 5A:
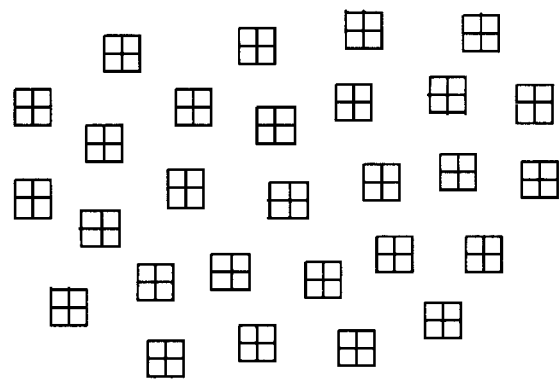
FIG. 5(a) shows an even distribution of a stochastic screen at 20%.
Figure 5B:
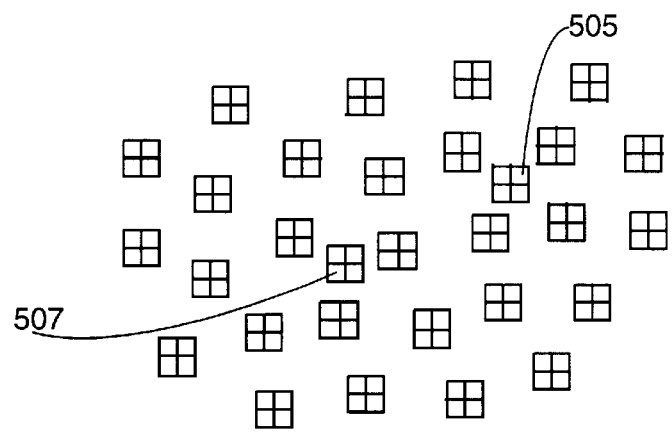
FIG. 5(b) shows a distribution where 1/20 of the pixels of FIG. 5(a) are added to give a stochastic pattern at 21%.

In order to further improve the final printed output, one can choose for the distribution of perforations that are used with the threshold arrays not to use a threshold of a constant fill using stochastic screen threshold array, but a specially designed stochastic pattern. The resulting perforated threshold arrays may be used for screening, or to generate bitmaps for bitmap lookup table screening. The reason one may want to improve on the repeating stochastic pattern generated from a stochastic threshold array is, as is known by those having skill and experience designing stochastic screens, that one of the major problems with stochastic screen design is that the resulting screens do not distribute the dots evenly in space. Some of the dots may be close together. This results from the threshold array limitation. With threshold arrays, a pixel location once set to black always remains black when density increases at that location in the original image. This is now demonstrated with the aid of FIG. 5. Suppose, for example by chance, that a particular stochastic pattern is reasonably uniformly distributed. FIG. 5(a) shows part of a very even distribution image of 20% screened with a stochastic screen of 2 pixel by 2 pixel clusters. If one instead needs to make a pattern based on screening a 21% image, using the same threshold array, one only can add a number of clusters to the existing clusters, that number being approximately 1/20 of the pixel clusters already set. This is shown in FIG. 5(b), which is the pattern of FIG. 5(a) with two pixels clusters 505 and 507 added. This relatively small number of clusters added inevitably will disturb the evenness of the existing pattern at 20%, if indeed that was an even pattern, resulting in a less than ideal pattern at 21%. Thus is it argued that using stochastic threshold arrays, there is no assurance of having an even distribution for any desired level of perforations.

For the present invention, it is not necessary to have the same stochastic screen pattern for all levels of perforations. In an alternate embodiment, one can design the stochastic pattern at the required perforation level from scratch, generating only a bitmap with the same repetition properties as the original classic screen, and then one can use this bitmap as the distribution of perforations. There clearly are many ways to so determine a repeating stochastic pattern. One method involves determining an initial stochastic pattern at the required perforations level using a stochastic threshold array as described above, and then redistributing the dots within the initial stochastic pattern. The preferred method for carrying out such a redistribution comprises a computer program which performs the following steps:

1. Define a displacement factor; initialize a mean displacement variable and a maximum displacement variable, where displacement is between all pairs of nearest neighbors.
2. For each dot in the initial stochastic pattern,
   (a) for the dot undisplaced, and the eight one-pixel displacements (left or right and/or up or down by one pixel) of the dot, examine the distance from the dot to the nearest neighbor, and if there is a displacement that gives greater distance to the nearest neighbor, displace to that location of the eight displacements giving greatest distance from the dot to the nearest dot;
   (b) update the average displacement variable if changed and the maximum displacement variable, if changed, with new values of the average displacement and maximum displacement, respectively, between all pairs of nearest neighbors; and
3. If the maximum displacements for all dots is greater than the displacement factor times the mean displacement between any two dots, repeat step 2, else stop.

Figure 5C:
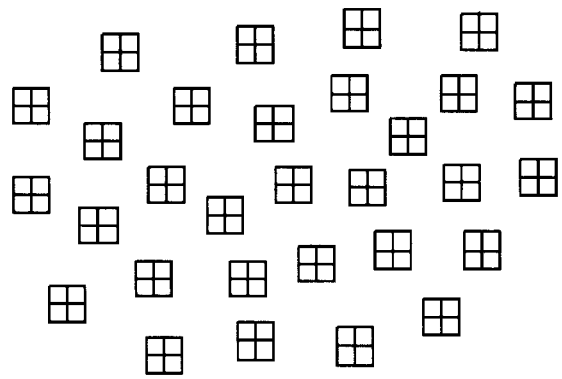
FIG. 5(c) shows a modified stochastic pattern at 21% which is nicely distributed.

In the preferred embodiment, a displacement factor of 1.2 is used. FIG. 5(c) shows a pattern at 21% which is produced from the stochastic pattern of FIG. 5(b) but is "nicely" distributed. Several alternatives to the preferred method of further dispersing dots are possible. For example, one might continue step 2(a) above until the variance or variance squared of the distance between pairs of nearest neighbors falls below some predefined threshold.

One disadvantage of the above described methods of screening using a perforated threshold array (or a set of perforated bitmaps for bitmap table lookup screening) is that it is impossible to avoid having perforations at the side of the halftone dots for certain percentages. As a result, there will be no guarantee that the printed dot will have the same size as the original printed dot. Consequently, this can have an influence on the density curve of the halftone reproduction. One method of compensating for this disadvantage is through measuring the curve and calculating a compensation curve. Such compensation methods are known in the art for conventional (i.e., non-perforated) screening. Most modern RIPs have the ability to take such a compensation curve into account when exposing a film or plate. However, this complicates matters and it is to be seen as an undesired side-effect.

Another disadvantage of the above described methods of screening using a perforated threshold array (or a set of perforated bitmaps for bitmap table lookup screening) occurs when halftone dots are small. In such a case, there is a risk that they will break away into two dots when a perforation inadvertently falls in the center of the cell. Pixels would remain black in such locations. In the case of the above described perforated threshold array based methods, this breaking up could be prevented by including a rule which forbids perforations to fall on places with low threshold values. How to so modify threshold arrays would be clear to those of ordinary skill in the art. There still would be an undesired side-effect: the quality of the 100% pattern would diminish.

Nevertheless, the above described methods of screening using a perforated threshold arrays or perforated bitmaps can produce at least the same quality results as obtainable using the methods described in the Existing Nouel Patents.

Using Bitmap Lookup Table Screening with Perforations Having Activity Ranges

The following variant produces good output quality, as it gives a high degree of control to the positioning, number and shape of the perforations.

To have a full control on the positioning of the perforations for all input image densities, the limitations inherent to using threshold arrays need to be relaxed. The classic way to do this is to replace the threshold array with a set of bitmaps which represent each separate density value. The number of bitmaps equals maxlevel+1, where maxlevel is the number of screen steps. Typical values are 200, 255 or the natural number of screen steps per screen dot.

For adding perforations, one proceeds as follows:

1. Start with a normal threshold array for screening, for example, a supercell based threshold array defined by integers A, B, M and N;
2. Convert the threshold array to a set of bitmaps, each bitmap having the same geometry as the original threshold array. In the bitmap for input density a, a pixel p is set to 1 if the corresponding pixel in the original threshold array is smaller or equal to a, else pixel p is set to 0;
3. Select the nature, number and position (distribution) of perforations. Once these are determined, the method of making perforations may be any one of the methods as described above. For example, one can use a stochastic threshold array of the same size as the bitmap on a constant density to produce a stochastic binary pattern of perforations, each perforation indicated by a 1 in the stochastic binary pattern. one then can modify this pattern to better distribute the perforations;
4. For each perforation, select an activity range, defined herein as the set of input densities for which the perforation is active. See below for details on how preferably this is done; and
5. For each perforation, make the appropriate pixel or pixels (in the case of multi-pixel perforations) white (value 0) in all the bitmaps corresponding to densities in the activity range of the perforation. This results in a set of bitmaps which can then be used to image a source image with traditional bitmap lookup table screening methods. How to screen using bitmap lookup table screening is known to those of ordinary skill in the art. The perforations in the bitmaps are in general different for different density bitmaps.

Many methods for selecting the activity ranges for any perforation are possible, and all are within the scope of the invention. Some of the possible alternatives for selecting appropriate activity ranges are now described.

The general principle is that normally, one does not want perforations to be active for very small halftone dots, as this will deteriorate their quality. Secondly, one does not want perforations to act at the perimeter of the dots of a given density, as this may make the dots smaller and "concave." Concave dots are known to produce lower quality results in the final printed press output.

Some possible rules for assigning activity ranges are now discussed.

Activity Rule 1: Activity Range=Full Range

This is the simplest activity rule, and results in a set of bitmaps that each have the same pattern of perforations.

Activity Rule 2: Activity Range=100%

As already said, one of the advantages of screening with perforations is that plates of large fully inked (100%) areas print better. In some situations, one may not want to influence any other density zones for fear of badly influencing density curves and/or color balances, etc. In such a case, one can opt for a very limited use of the perforations. Only the black areas will be perforated.

Activity Rule 3: Activity Range Determined by the Neighborhood

With this activity rule, a potential perforation becomes valid only when there is a minimal number of black pixels surrounding the potential perforation. This guarantees that around any perforation, there are enough black pixels remaining to ensure that upon printing, the perforation will be filled with a mixture of water and ink, this in order to avoid white holes on the printed paper. This activity rule also can be used to make sure the perimeter of a solid black area, for example, a halftone dot, is not perforated. This rule likewise can be used to make sure that too small a black area, such as a small halftone dot, is not broken up into two small black areas. In one implementation, activity rule 3 is used as follows: a pixel may only be perforated (i.e., set to 0) in the output if all 24 pixels in the surrounding of the current pixel are set to black (value 1 in the perforations bitmap). A pixel is in the surroundings of another pixel if it is two or less pixels away in either dimension. A pixel with integer coordinates values (in pixels) of v in the vertical direction and h in the horizontal direction is thus in the surroundings of a pixel with integer coordinates values (in pixels) of curv and curh in the vertical and horizontal directions, respectively if curv$-2 \leq v \leq$curv$+2$ and curh$-2 \leq h \leq$curh$+2$. Excluding the pixel itself, there thus are 24 pixels in the surrounding of one pixel.

Activity Rule 4: Activity Range Determined by a Frequency Profile

In general, the total number of perforations is a function of the density. Rule 4 implements an explicit function. Typically, a preferable implementation is to have more perforations for the higher density screen bitmaps. Activity rules 1, 2 and 3 are special cases of general rule 4. Activity rule 1 implements a linear growth of the number of perforations with density, activity rule 3 corrects the profile for avoiding perforations in too small dots, and activity rule 2 makes uses for the frequency profile a step function which is 1 at 100% density, and 0 elsewhere. To apply generalized activity rule 4, one determines a curve for the number of perforations, for example based on measurements on a test sheet, and uses this curve to determine the activity range of the perforations.

Combinations of Activity Rules 1, 2, 3 and/or 4

Some of the above activity rules are not mutually exclusive and can be combined in order to improve the final (printed) results for different situations.

Figure 6:
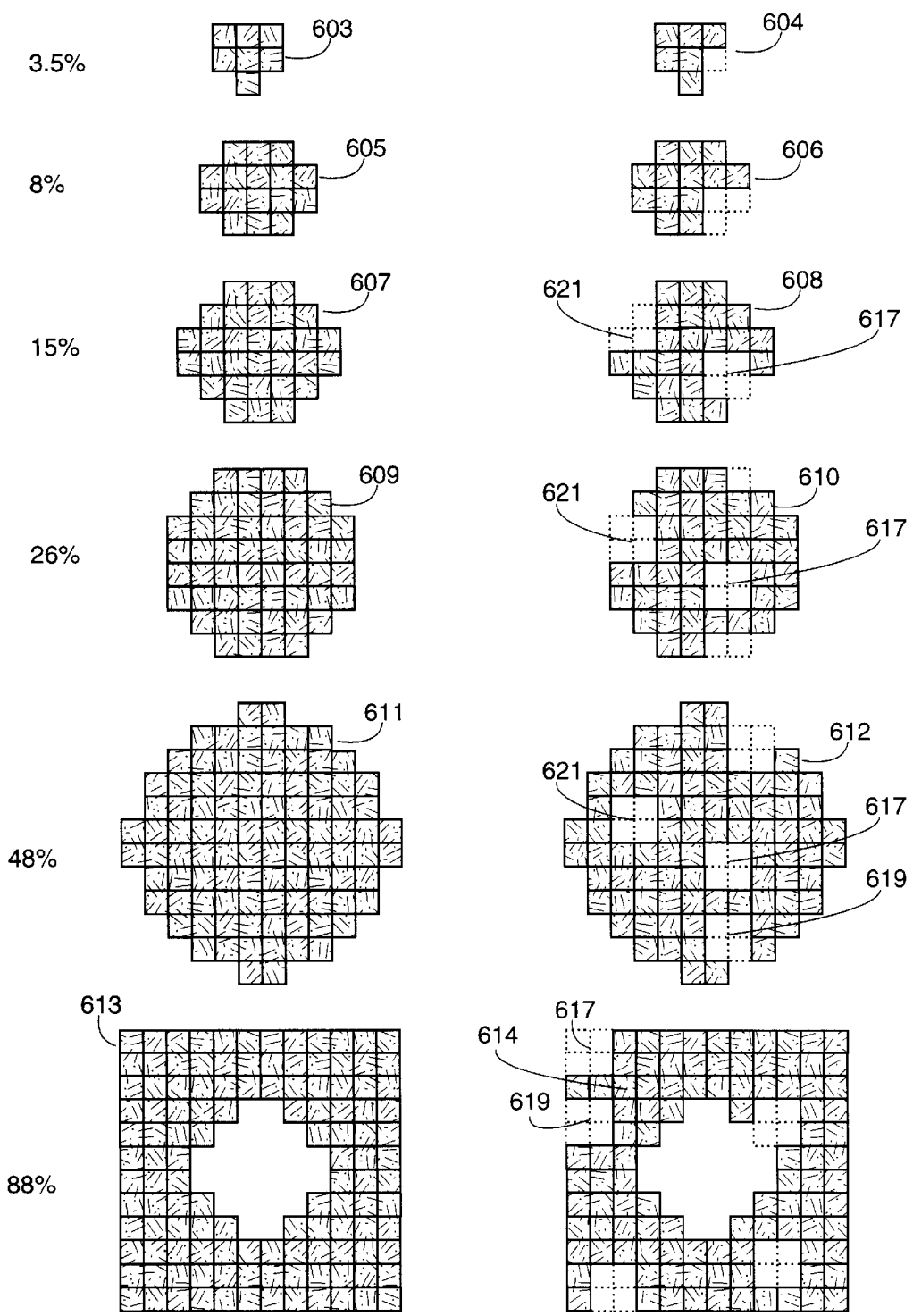
FIG. 6 illustrates the limitations of perforations generated through screening with a threshold array.
Figure 7:
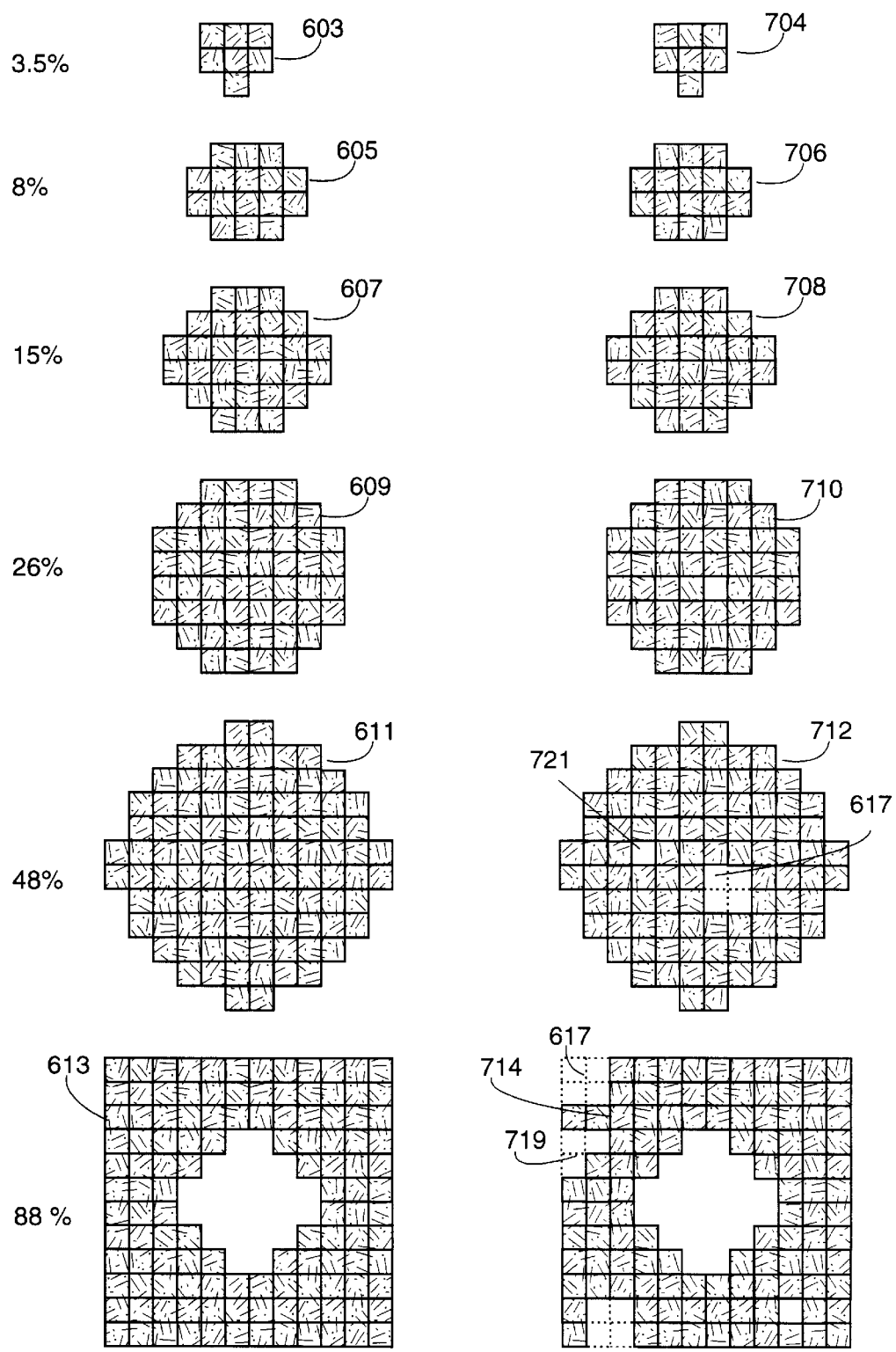
FIG. 7 illustrates the effect of the improved method of this invention, using a set of bitmaps for bitmap lookup table screening.

FIGS. 6 and 7 illustrate use of activity rule 3 to improve performance of a threshold array based perforated screening method (or equivalently, a bitmap lookup table screening method without activity rules). On the left hand parts of both FIGS. 6 and 7, halftone dots 603, 605, 607, 609, 611, and 613 are shown as parts of the bitmaps for input densities of 3.5%, 8%, 15%, 26%, 48%, and 88%, respectively, these bitmaps produced using a threshold array for a classical screen. Only one quadrant of halftone dot 613 is shown, translated up and to the left by half a dot period, and the quadrant is shown together with the three quadrants of dot 613's neighbors to the right, right and down, and down only in the bitmap for 88%. The right hand side of FIG. 6 shows how each of the screen bitmaps for the six densities is perforated according to the embodiment of this invention which always adds perforations (equivalent to using activity rule 1 and to not using an activity rule, and also equivalent to using a perforated threshold matrix rather than a bitmap lookup table method for screening). There are some undesired effects. For example, in the 15% density case, dot 608 has perforations 621 and 617, causing dot 608 to print small. This in turn would cause a shift in the expected density curve during printing. Note that perforations 617 and 619 which appear on the bottom right quadrant of 48% dot 612 appear in the top left hand quadrant of the drawing of 88% dot 614 because of the shift by one-half a dot period. FIG. 7 shows the corresponding results on the right hand side for using activity rule 3, specifically, that a pixel may only be perforated (i.e., set to 0) in the output if all 24 pixels in the surroundings of the current pixel are set to black (value 1 in the perforations bitmap). Perforation 621 of the 48% perforated halftone dot 612 of FIG. 6 is reduced in size to perforation 721 of the 48% perforated halftone dot 712 of FIG. 7. Perforation 619 of the 88% perforated halftone dot 614 of FIG. 6 is reduced in size to perforation 719 in perforated halftone dot 714 of FIG. 7.

Detailed Description of the Second Alternative Embodiment

The second embodiment for adding perforations is for the case when the input image is a pre-screened bitmap.

The preferred implementation of the method comprises following steps:

1. Start with the original (screened) bitmap, for example in a file such as a monochrome TIFF file. TIFF is a commonly used format for image files;

2. Generate a second bitmap which defines the position, nature and number of perforations. The second bitmap should be at least as large as the original bitmap. A pixel set to 1 means that the pixel is a perforation. The rules to determine the position, nature and number of the perforations are the same as those described elsewhere herein, for example, as methods for adding perforations to a supercell threshold array;

3. For each black pixel in the original bitmap, determine whether the corresponding pixel in the perforation bitmap is set to 1. If this is the case, set the pixel in the original bitmap to white.

This basic implementation may be altered with several improvements:

The method may be modified to run, for example, in real time in conjunction with a RIP or halftoning process. That is, the original bitmap of step 1 may be the result (i.e., output) of a RIP or halftoning, which is buffered line by line or buffered in sets of scanlines in a memory, the perforations of step 2 stored in a second memory, and Step 3 carried out, for example in real-time.

Step 2 may be modified so that less memory is required for storing a complete perforations bitmap. Instead of generating a full perforations bitmap, one generates a limited bitmap, which is designed in such a way that it can be repeated without the repetition being visible in the repeated result.

As already described elsewhere herein (see "detailed description of the first alternative embodiment"), this can be done through thresholding a stochastic screen or through a special pattern design which takes care of the repetition. The pattern is preferably stochastic in order to avoid moiré patterns from interference with the screened original image.

Step 3 could be altered with activity rules, as described elsewhere herein (again see "detailed description of the first alternative embodiment"). For example activity rule 3 may be used: the perforation is only used (made valid) if enough of the surrounding pixels in the original bitmap are set to black. This way, the perimeters of the original dots and lines are always preserved (protected), thus avoiding loss of sharpness.

Figure 8A:
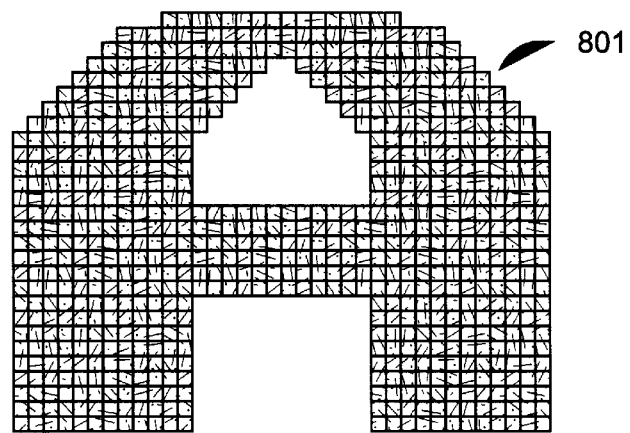
FIG. 8(a) is the original bitmap, corresponding to a letter A.
Figure 8B:
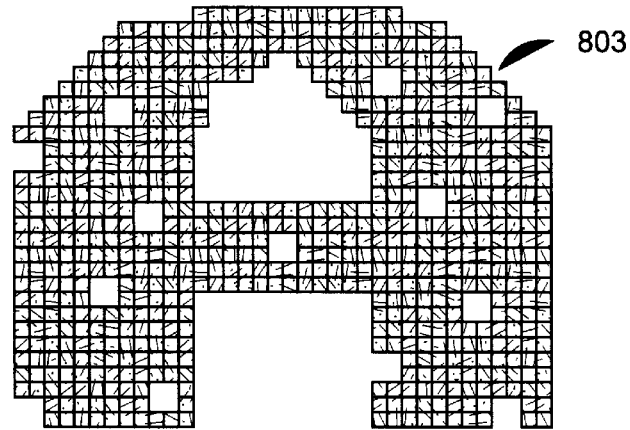
FIG. 8(b) shows a perforated result, as will be produced when the method does not take the perimeter of the letter into account.
Figure 8C:
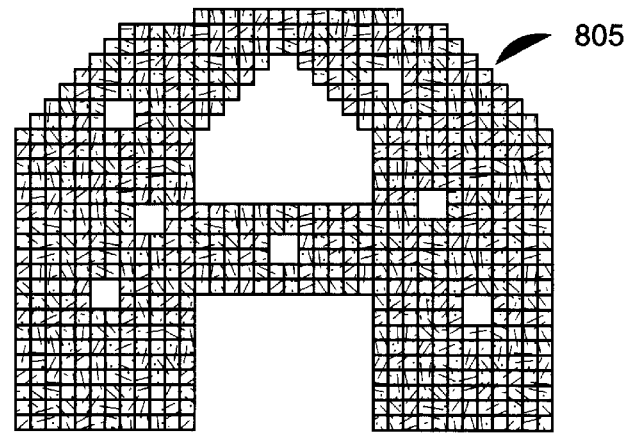
FIG. 8(c) shows an improved result, where the perimeter of the letter is preserved, but where the internal of the letter is perforated, using activity rules according to an aspect of the invention.

FIG. 8 illustrates use of activity rule 3 on a sample text font (i.e., a 100% area on a page) of the letter "A" using this second alternative embodiment. FIG. 8(a) shows a font 801 without any perforations. FIG. 8(b) shows the results 803 of using the unaltered version of the second alternative embodiment. Some of the perforations are close to the perimeter of the font, which may lead to loss of sharpness. FIG. 8(c) shows the corresponding results 805 when step 3 is altered by using activity rule 3, specifically, that a pixel may only be perforated (i.e., set to 0) in the output if all 24 pixels in the surroundings of the current pixel are set to black (value 1 in the perforations bitmap).

Detailed Description of the Third Alternative Embodiment

In the third alternative embodiment, one starts with a page description. The method comprises:

1. Creating a bi-level image file containing the desired positions and sizes of the perforations. This can be done with a separate computer program, which writes the resulting perforations image to a file such as a monochrome TIFF file. The bi-level perforations preferably should be at least as large as the printing plate to be used (which can be big in the case of imposed files);
2. Incorporating the perforations image in the page description of the plate as a layer (a "perforating layer") on top of all other graphic elements. This image is given the "erase" attribute. That is, a masking object of the complement is made. The inclusion may be carried out manually with a graphic editor. A preferred alternative is a computer program which accepts as input the modified page description (for example, in PostScript) and the bi-level perforations image (for example, in the TIFF G4 format common for bi-level images) and writes a modified page description (typically the same format as the first page description). The bi-level image now becomes part of the page description; and
3. RIPing the modified page description into image plates with a normal RIP designed for the particular page description format. In the case of a PostScript description, PostScript RIP is used to image the design with the perforations included. The bitmap perforations layer is erased from halftoned objects in the final plates by the RIP. That is, its complement is taken as a masking object by the RIP.

Several variants are possible within the scope. These include:

Diminishing the size of the bi-level pattern when it is replaced by a repeating pattern (a "tile") which tiles the whole original. The repeating pattern preferably is made in such a way that the repetition is barely visible or not visible. A method of how to make a tile which repeats without an undesirable pattern is described above as part of the first alternative embodiment. In the first embodiment, the repeating pattern is used to generate a whole screen, while in this third embodiment it is used to generate a bi-level masking overlay in the original page description; and Not including the bi-level pattern in the file, but rather applying it to the image just before halftoning. This typically is possible with raster image processors that allow one to insert such operations just before halftoning.

The main advantage of the third alternative method is that only one new element is needed, a file comprising the perforation pattern. No alterations to the RIP, the screening or the imagesetter device are needed.

It should be noted that the adding, preferably automatically, of the perforations image may be carried out just before RIPing. Alternatively, the adding could be integrated with the RIP.

It should be noted that with this third embodiment there is no control on where the perforations fall with respect to the image elements such as fine lines or small screen dots. This also is the case with the non-digital method described in the above mentioned Nouel patent applications. Thus, the third alternative embodiment provides the same quality as the prior art non-digital methods.

Description of Combined Use of the Alternate Embodiments

Which of the first, second and/or third alternative embodiments to use depends on the workflow. A preferred embodiment which uses more than one of these alternate embodiments is now described. One starts from a PostScript® file (preferably a "Level 2 PostScript" file) which includes a page description of elements for RIPing, and a set of image bitmaps which are to be stripped in the final result. This is not an atypical problem confronting today's printing professionals who make their own films or plates. The additional bitmaps are delivered, for example, from a third party and might contain information such as advertisements or scanned images. Typically, these bitmaps will not be placed into the PostScript files, but will be added to the final bitmap in a later stage. In the example, it is assumed TIFF files are used for the bitmaps.

In the preferred embodiment, the bitmaps follow a different path than the PostScript data. The bitmaps are sent through a computer program implemented on a computer system such as system 110, the computer program implementing the steps of the "second alternative embodiment," which accepts each bitmap image data (assumed in TIFF format) and outputs bitmap data including perforations in the same TIFF format. In order to give good results, activity rule 3 is used as follows: the computer program only sets a pixel to 0 if all 24 pixels in the surrounding of the current pixel are set to black (value 1 in the perforations bitmap). The surrounding of a pixel is defined as follows: a pixel with integer coordinates values v in the vertical direction and h in the horizontal direction, respectively (denoted (v, h)), is defined to be in the surrounding of a current pixel (coordinates (curv, curh) if it is not the current pixel itself and v and h satisfy curv$-2 \leq v \leq$curv$+2$ and curh$-2 \leq h \leq$curh$+2$.

Normally, PostScript® files may be RIPed using one of many commercial RIPs capable of interpreting PostScript commands. RIPs compatible with "Level 2 PostScript" have become a standard in recent years so are in widespread use in the graphic arts industry. One such RIP, the Barco Graphics FastRip™ made by Barco Graphics, the assignee of the present invention, allows several screening methods to be used, including a set of bitmaps for bitmap lookup table screening. Barco Graphics FastRip™ is the RIP used in this preferred embodiment of the invention, and any RIP that allows or can be modified to implement bitmap lookup table screening may equivalently be used.

As described in the PostScript® Language Reference Manual, Second Edition, (by Adobe Systems, Inc., published by Addison Wesley, ISBN: 0-201-181127-4) screening in a Level 2 PostScript RIP is determined by a "default screening method" which can be changed through the setscreen, setcolorscreen and sethalftone commands. sethalftone is the most general way, and every halftone (or screen) that can be defined using setscreen or setcolorscreen can also be defined as a halftone dictionary, which then can be used with a sethalftone command. The default screening method usually is set in a prologue script which is not part of the PostScript file, but run separately to define several parameters of the RIP. The default screening method set in such a script applies for all PostScript files RIPed afterwards as long as no setscreen, setcolorscreen or sethalftone commands are encountered in the PostScript file.

Each type of halftone dictionary can be brought back to a set of one of two basic screen definition types: the setscreen method and the threshold array method. The setscreen method defines the screen through a frequency, angle and spot function. Most PostScript RIPs convert setscreen definitions into threshold arrays. Methods to convert setscreen definitions into threshold arrays are known to those skilled in the art. Thus only threshold arrays will be discussed herein in the context of PostScript RIPing.

In the embodiment using the Barco Graphics FastRip™, when a particular threshold array is made current (through the prologue script, or the setscreen, setcolorscreen or sethalftone command), it is first sent to a software routine which converts the threshold array into a set of bitmaps containing perforations. The routine follows the steps described hereinabove (see "using bitmap lookup table screening with perforations having activity ranges" in the description of the first alternative embodiment). Perforation sizes are 1 by 1 pixel for all output resolutions under 1200 ppi, 1 pixel by 2 pixels for resolutions between 1200 and 2000 ppi, and 2 pixels by 2 pixels for resolutions between 2000 and 3000 ppi, and so on. The RIP screens all incoming data (including 100% input density values) with this set of bitmaps as follows. For each input pixel, its vertical and horizontal position, denoted v and h, respectively, is determined in the supercell which defines the bitmap for the density a (integer value) of the pixel. Note that a is first reduced by linear interpolation to be equal to the number of bitmaps in the set of bitmaps. The corresponding pixel (v, h) in the bitmap for density a is then copied to the output. This method can be modified for optimal processing depending on the kind of input (linework or contone).

As in the case of processing original image bitmaps, the result of the PostScript RIP process is a bitmap. This bitmap can be written in a file, which can be used to expose, together with the bitmap files that followed the bitmap-original processing path, on a laser imagesetter. Alternatively, instead of writing to a file, one could also bring together "on the fly" the PostScript screening result and the bitmaps. The merging is then done line by line (or strip by strip), and the lines (or strips) directly sent to the imaging device.

It is also possible to RIP the PostScript data to a bitmap first, without perforations, and then add the perforations following the second alternative embodiment. Although the result is certainly as good as that obtained by using the first alternative embodiment, the method is time consuming and generates extremely large files. Moreover, in a workflow where the PostScript RIP is directly coupled to the imaging device, the generation of bitmap files is an additional step which will disrupt the overall workflow.

Preferably, the plates produced as described hereinabove have, for at least one given density, a number of perforations per screen cell which is between 0.9 and 1.1 times the mean number of screen dots per screen cell.

One version of the invention includes a plate that has perforations only in 100% areas, leaving halftone areas (less than 100% density) unaltered, i.e., without perforations. Any of the methods described hereinabove may be used for generating the perforations. Within this version, sometimes it is desirable to only have part of the 100% areas include perforations.

, the plates produced as described hereinabove have, for at least one given density, a number of perforations per screen cell which is between 0.9 and 1.1 times the mean number of screen dots per screen cell.

One aspect of the invention is the use of a perforated plate produced as described hereinabove for wet offset printing.

Another aspect of the invention is the use of a perforated plate produced as described hereinabove for wet offset printing.

The description and claims herein describe the invention in terms of an offset plate used for printing. As would be clear to those of ordinary skill in the art, a film often is used to make such an offset plate, and whatever characteristics are required in the offset plate, corresponding characteristics also would be required in the film, the correspondence depending on whether the film is positive or negative. In the description and claims, therefore, it is understood that the word "offset plate" means the offset plate and/or the corresponding film for making the offset plate for the case that such a film is used.

Although this invention has been described with respect to preferred embodiments, those embodiments are illustrative only. No limitation with respect to the preferred embodiments is intended or should be inferred. It will be observed that numerous variations and modifications may be effected without departing from the true spirit and scope of the novel concept of the invention, and it is intended that the scope of the invention be defined by the claims.

What is claimed is:

1. An offset plate for printing, the offset plate comprising ink repelling zones and ink receptive zones, the offset plate representing a image to be printed, the offset plate including at least one screened area generated by a digital screening process, at least part of the screened area including perforations, the perforations generated by the digital screening process.

2. The offset plate according to claim 1, where the ink repelling particles are included by leaving them unexposed for offset plates or films where exposed dots generate ink receptive zones, or by exposing them for those plates or films where exposed dots generate ink repelling zones.

3. The offset plate according to claim 1, wherein the extents of the perforations are between 3 and 80 micron.

4. The offset plate according to claim 1, wherein the extents of the perforations are between 10 and 35 micron.

5. The offset plate according to claim 1, where each ink receptive zone of at least 200×200 micron in the screened area contains at least one ink repelling particle.

6. The offset plate according to claim 1, where the positions of the ink repelling particles perforations generated by the digital screening process are determined by a stochastic screen.

7. The offset plate according to claim 1, where for at least one given density the number of perforations per screen cell is more than 0.9 times and less than 1.1 times the average number of perforations per screen cell.

8. A method for producing an offset plate for printing an image, the offset plate including perforations, the image provided as an original page description including original design elements, the method comprising the steps of:

(a) building up a new page description by adding an erasing layer on top of at least a subset of the original design elements, the erasing layer forming perforations having an extent of between 3 micron and 80 micron in the original design elements; and (b) using the new page description to producing offset plates meant for printing.

9. A method for producing an offset plate for printing an image, the offset plate including perforations, the method comprising the steps of:

(a) providing a halftoning process for determining whether a pixel in an image is to be a black or white output pixel in the offset plate;

(b) if the image is provided in a form other than pixels, raster image processing the image into pixels;

(c) for each pixel, deciding whether the pixel is in a perforation in the offset plate;

(d) if the pixel is not in a perforation, determining an output pixel for the offset plate using the provided halftone process to determine whether the output pixel is black or white;

(d) if the pixel is in a perforation, generating an output pixel that is white; and (e) using the output pixels generated in steps (a) and (b) to produce the offset plates.

10. A method for producing an offset plate for printing an image, the offset plate including perforations, the method comprising the steps of:

(a) providing an original threshold array for screening the image to be printed;

(b) determining the nature, number and position of the perforations to be included in the existing offset plate;

(c) generating a modified threshold array by setting each matrix element in the original threshold array that corresponds to a perforation to a predetermined value that ensures that the element is prevented from being set black when used for halftoning, regardless of the density value of the image to be printed; and (d) using the modified threshold array in place of the original threshold array to produce the offset plate for printing the image.

11. The method of claim 10 where the original threshold array is a conventional screen.

12. A method for producing an offset plate for printing an image, the offset plate including perforations, the method comprising the steps of:

(a) providing an original threshold array of a source image to be printed;

(b) converting the original threshold array to a set of bitmaps, each bitmap having a number of rows and a number of columns equal to the respective number of rows and number of columns in the original threshold array;

(c) determining the number and the size of the perforations;

(d) determining for each perforation the location and the density ranger at which the perforation is valid;

(e) for each perforation, making the appropriate pixel or pixels white in all bitmaps corresponding to densities where the perforation is valid; and (f) using this set of bitmaps to image the source image into an offset plate.

13. The method according to claim 12 where the original threshold array is a classical screen.

14. A method for including perforations in an original bitmap of an image to be printed, the method comprising the steps of:

(a) defining the position, nature and number of the perforations;

(b) for each black pixel in the original bitmap, determining whether the pixel corresponds to a perforation;

(c) if the pixel corresponds to a perforation, setting the pixel in the original bitmap to white to form an output bitmap, else if the pixel does not correspond to a perforation, setting the output bitmap to be identical to the original bitmap; and (e) using the output bitmap in place of the original bitmap for making an offset plate for printing.

15. The method of claim 14, further including reading the original bitmap from a file.

16. The method of claim 14, wherein the original bitmap is a buffered result of a digital halftoning process.

17. The method of claim 14 where the position, nature or number of the perforations are determined by a stochastic screening method.

18. The method of claim 14 where the position, nature or number of the perforations are determined by a repeating pattern.

19. The method of claim 14 wherein a black pixel of the original bitmap is not set white when it corresponds to a perforation if at least one of its eight neighboring pixels is white in the original image.

* * * * *